United States Patent

Fargues et al.

Patent Number: 6,108,373
Date of Patent: Aug. 22, 2000

[54] PROCESS AND DEVICE FOR DETECTING LOSS OF CARRIER RECOVERY AND OF DETERMINING THE EB/NO RATIO OF A DIGITAL TRANSMISSION LINK

[75] Inventors: Alain Fargues, Conflans Ste-Honorine; Mani Kimiavi, Paris, both of France

[73] Assignee: Alcatel Telspace, Nanterre Cedex, France

[21] Appl. No.: 08/355,973

[22] Filed: Dec. 14, 1994

[30] Foreign Application Priority Data

Dec. 15, 1993 [FR] France ................................ 93 15086

[51] Int. Cl.[7] .................................................. H04B 3/46
[52] U.S. Cl. ........................................ 375/227; 375/329
[58] Field of Search .................................. 375/225, 224, 375/222, 279, 280, 329, 332, 227, 226, 228; 455/226.1, 226.3; 371/5.1; 324/613, 614

[56] References Cited

U.S. PATENT DOCUMENTS

| | | | |
|---|---|---|---|
| 4,381,546 | 4/1983 | Armstrong | 455/67 |
| 4,449,222 | 5/1984 | Crossett III, et al. | 375/224 |
| 4,555,790 | 11/1985 | Betts et al. | 375/224 |
| 4,633,465 | 12/1986 | Fitch et al. | 371/6 |
| 4,773,083 | 9/1988 | Baumbach et al. | 375/224 |
| 4,827,431 | 5/1989 | Goldstein | 375/371 |
| 4,991,184 | 2/1991 | Hashimoto | 375/222 |
| 5,216,697 | 6/1993 | Ohnuki | 375/224 |
| 5,333,147 | 7/1994 | Nohara et al. | 375/224 |
| 5,438,591 | 8/1995 | Oie et al. | 375/261 |
| 5,440,582 | 8/1995 | Birchler et al. | 375/227 |
| 5,440,590 | 8/1995 | Birchler et al. | 375/227 |

*Primary Examiner*—Tesfaldet Bocure
*Attorney, Agent, or Firm*—Sughrue, Mion, Zinn, Macpeak & Seas, PLLC

[57] ABSTRACT

A process of determining the Eb/No ratio of a digital transmission is applied to a signal having a plurality of phases made up of two data streams in phase quadrature providing in each symbol time a received sample whose position in the constellation is defined by its coordinates obtained by quantizing the data streams. This process determines the number of erroneous samples received during a given time period whose coordinates correspond to those of indicative samples, the coordinates of the indicative samples being different from those of optimal samples received under optimal transmission conditions. The process then calculates the ratio between the number of erroneous samples and the total number of samples received in this time period, the calculated ratio being inversely proportional to the Eb/No ratio.

12 Claims, 5 Drawing Sheets

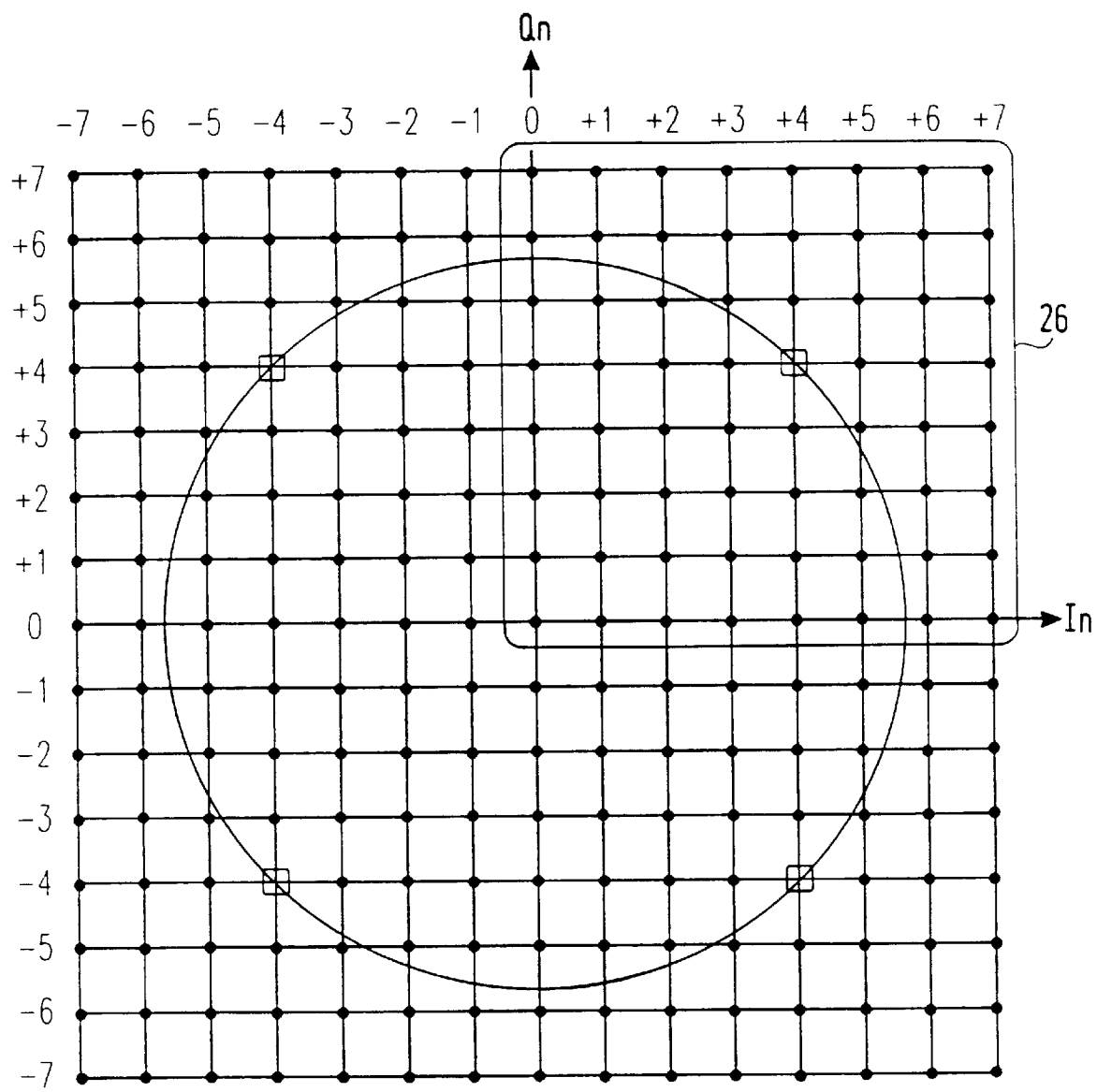

PROCESS AND DEVICE FOR DETECTING LOSS OF CARRIER RECOVERY AND OF DETERMINING THE EB/NO RATIO OF A DIGITAL TRANSMISSION LINK

BACKGROUND OF THE INVENTION

1. Field of the Invention

The field of the invention is that of digital signal transmission systems using phase shift keying.

To be more precise, the present invention concerns a method of and a device for determining the Eb/No ratio of a communication link (for example a microwave link), this ratio representing the ratio of the energy per bit to the noise spectral density, proportional to the bit error rate (BER). The process is used in a modem receiving multiple phase digital signals. The invention can be used to detect loss of carrier recovery.

2. Description of the Prior Art

The ratio of the energy per bit to the noise spectral density, usually called the Eb/No ratio, or the BER is used to assess the quality of transmission, for example the quality of a satellite communication channel. A knowledge of this value enables automatic adaptive correction of the parameters of the demodulator system, for example the bandwidth or the slope of the receive Nyquist filter. It can also be beneficial to display the Eb/No ratio at the receiver to indicate to the user the quality of transmission and the quality of demodulation by their modem.

In existing systems the Eb/No value is deduced from the bit error rate obtained using Viterbi or Reed Solomon type error codecs. However, it takes a long time to determine the BER as this requires integration over a large number of received samples. Also, error coding/decoding can mask the true Eb/No value and the changes made to the filter parameters are then inadequate or incorrect.

One object of the present invention is to overcome these drawbacks.

To be more precise, one object of the invention is to provide a fast and reliable process for determining the Eb/No ratio of a transmission channel.

Another object of the present invention is to provide a process of this kind which is independent of the type of link so that it can be used whether the data transmitted and received is encoded or not. If the data is not encoded the Viterbi or Reed Solomon algorithms are not used and it is then not possible to determine the Eb/No ratio. The invention must make it possible to determine the Eb/No ratio of an uncoded link, for example a differential link.

A further object of the present invention is to detect loss of carrier recovery.

A complementary object of the invention is to provide a device implementing the process defined above.

SUMMARY OF THE INVENTION

These objects, and others that emerge hereinafter, are achieved by a process of determining the Eb/No ratio of a digital transmission, said process being applied to a signal having a plurality of phases made up of two data streams in phase quadrature providing in each symbol time a received sample whose position in the constellation is defined by its coordinates obtained by quantizing said data streams, which process consists in:

determining the number of erroneous samples received during a given time period whose coordinates correspond to those of indicative samples, the coordinates of said indicative samples being different from those of optimal samples received under optimal transmission conditions; and calculating the ratio between said number of erroneous samples and the total number of samples received in said time period, the calculated ratio being inversely proportional to said Eb/No ratio.

Accordingly, by processing the samples before the decision stage, it is possible to determine a value comparable to the Eb/No ratio merely by comparing the samples received with a number of indicative samples.

The indicative samples advantageously form collection areas, one of the collection areas being located at the center of the constellation and the other collection areas being each located between two of the optimal (i.e. ideal) samples, and the calculated ratio crossing a predetermined threshold value generates an alarm signal indicating that the carrier frequency has been lost.

In another implementation the indicative samples form a single collection area at the center of the constellation and the calculated ratio crossing a predetermined threshold value generates an alarm signal indicating that the carrier frequency has been lost at the remote end of the link.

In another implementation, the indicative samples are all the samples of the constellation except for the optimal samples. This implementation supplies a value corresponding to an Eb/No ratio closest to reality, i.e. truly representative of the noise affecting the received signal.

The process of the invention can be applied to a PSK modulated signal in which the number of phase states is 2, 4, 8 or greater.

In another aspect, the invention consists in a device for determining the Eb/No ratio of a digital transmission receiving a signal with a plurality of phases comprising two data streams in phase quadrature constituting in each symbol time a received sample whose position in the constellation is defined by its coordinates obtained by quantizing said data streams, said device including:

means for counting the number of erroneous samples received in a given time period whose coordinates correspond to those of indicative samples, the coordinates of said indicative samples being different from the coordinates of optimal samples received under optimal transmission conditions; and means for calculating the ratio between said number of erroneous samples and the total number of samples received during said time period, the calculated ratio being inversely proportional to said Eb/No ratio.

Other features and advantages of the present invention emerge from a reading of the following description of preferred embodiments of the invention given by way of non-limiting illustrative example only and from the appended drawings.

BRIEF DESCRIPTION OF THE DRAWINGS

FIG. 2 shows a constellation of a QPSK modulated signal with each sample coded on four bits, one of which is a sign bit, the indicative samples being all the samples that can be received except for the optimal samples.

DETAILED DESCRIPTION OF THE PREFERRED EMBODIMENTS

Figure 1:
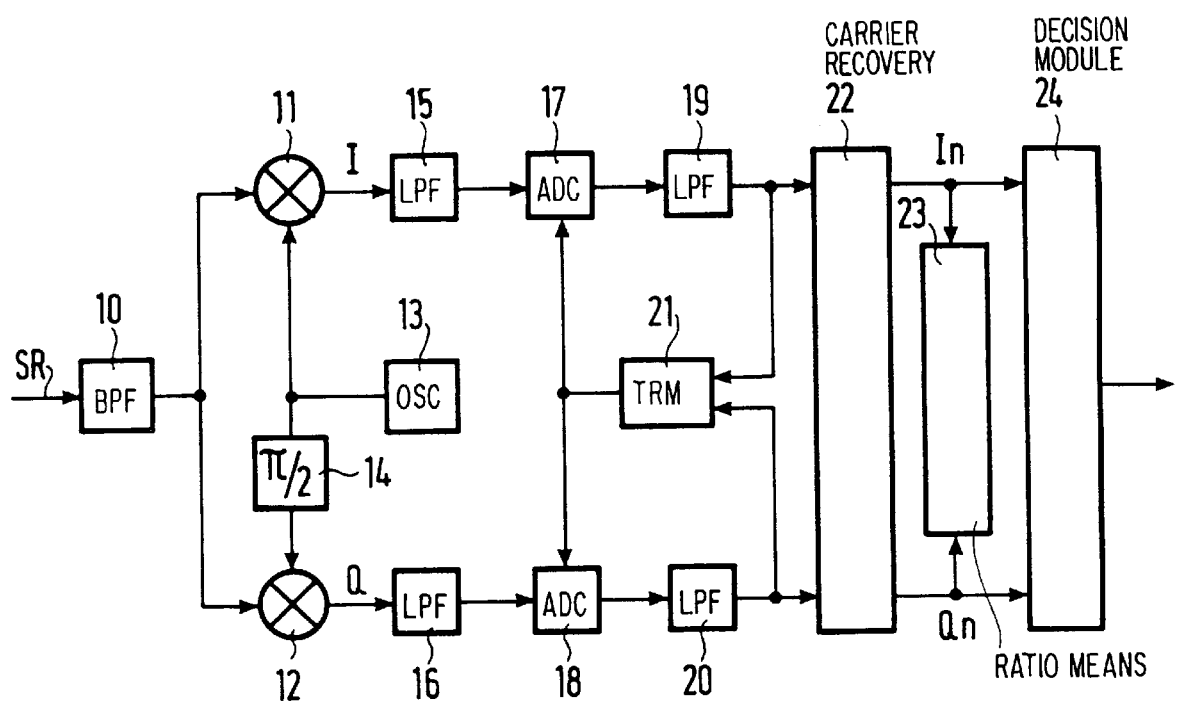
FIG. 1 is a block diagram of a demodulator stage of a phase modulated digital signal receiver, this stage including an Eb/No ratio measuring device in accordance with the present invention.

The FIG. 1 block diagram is essentially the same as that described in French patent application No 93 00051 filed Jan. 6, 1993 by the assignees of the present application. The demodulator stage is entirely digital. The invention naturally applies equally well to a demodulator using an analog carrier recovery loop, such as a conventional Costas loop.

A received signal SR is applied to the input of an intermediate frequency bandpass filter 10 driving two multipliers 11, 12 which multiply the output signal of the filter 10 by two signals in phase quadrature. One of these signals is obtained directly from a local oscillator 13 and the other from a π/2 phase-shifter 14. The local oscillator 13 generates a signal whose frequency is equal to the center frequency of the received signal SR. The output signals of the multipliers 11, 12 constitute two components I and Q in phase quadrature. These signals I and Q are applied to anti-aliasing lowpass filters 15, 16 driving analog/digital converters 17, 18 producing two digital components in quadrature. The converters 17, 18 drive Nyquist root lowpass filters 19, 20 whose outputs are fed to a timing recovery module 21 producing the clock signal controlling the converters 17, 18. A digital carrier recovery device 22 also receives the output signals from the filters 19, 20.

The function of the digital carrier recovery device 22 is to rotate the constellation of phase states of the received signal in accordance with an indication of the angular offset of the constellation. In the application mentioned above the device 22 is a phase locking type device. The demodulator stage can equally be of the analog type and include a Costas loop type carrier recovery device operating directly on the local oscillator 13.

The device 22 supplies two digital data streams In, Qn in phase quadrature constituting at each symbol Ts a received sample. The position of each sample in the constellation is defined by its coordinates (abscissa and ordinate) obtained by quantizing the analog data streams I and Q. This quantizing can be applied to seven bits, for example, including a sign bit, as explained below. The coordinates In and Qn of each sample determine its position in the constellation. In the absence of noise, with PSK modulation with M phase states, the samples received assume only M positions in the phase plane, each position corresponding to that of a sample referred to hereinafter as an optimal (i.e. ideal) sample.

The device 22 supplies the digital data streams to a device 23 (shown in detail at FIG. 6) in accordance with the invention for measuring the Eb/No ratio and to a decision module 24 which establishes the association between a symbol and each pair of components in quadrature of the received signal and supplies the demodulated data. With QPSK modulation two data values are extracted from each sample.

FIG. 2 shows a constellation of a QPSK modulated signal in which each sample is coded on four bits including a sign bit. The phase component (In) is plotted on the abscissa axis and the quadrature component (Qn) is plotted on the ordinate axis. The position of each sample in the constellation can be determined with an accuracy proportional to the number of coding bits.

The optimal samples are shown by squares and lie on a circle whose center has the coordinates (0,0). These optimal samples are those received in the absence of noise and if the carrier recovery device 22 is operating perfectly.

On the other hand, if carrier recovery is defective (phase slip or carrier frequency loss) or if there is excessive noise on the link, the samples received no longer correspond to the expected optimal samples. The invention counts the number of samples received which do not correspond to optimal samples in order to determine a magnitude which is inversely proportional to the Eb/No ratio.

To this end, the invention determines the number of erroneous samples received during a given time period whose coordinates correspond to those of indicative samples, the coordinates of these indicative samples being different from those of the optimal samples, and then calculates the ratio between the number of erroneous samples and the total number of samples received during this time period. This ratio is inversely proportional to Eb/No.

The best way to determine the Eb/No ratio is to count all the received samples whose coordinates are different from those of the optimal samples. In FIG. 2 and the other figures showing constellations, the indicative samples are indicated by dots.

Referring to FIG. 2, the optimal samples have the coordinates (4, 4), (−4, 4), (−4, −4) and (4, −4) and the indicative samples counted are all the other received samples. The Eb/No ratio is inversely proportional to NBEE/(NBEE+NBEO) because NBEE+NBEO is the total number of samples received in the time period concerned, NBEE is the number of erroneous samples received and NBEO is the number of optimal samples received. This provides a fast and reliable estimate of the Eb/No ratio, for example after receiving only 100 samples.

Note in passing that NBEE is equal to NBET-NBEO here NBET is the total number of samples received in the given time period. This process is therefore equivalent to counting the number of optimal samples received and the total number of samples received to determine Eb/No. It is easier to compare each sample received with four possible optimal samples than to compare each sample received with the indicative samples (the number of which is much greater). This solution will therefore be preferable in the practical implementation of the device of the invention as described below.

Figure 3:
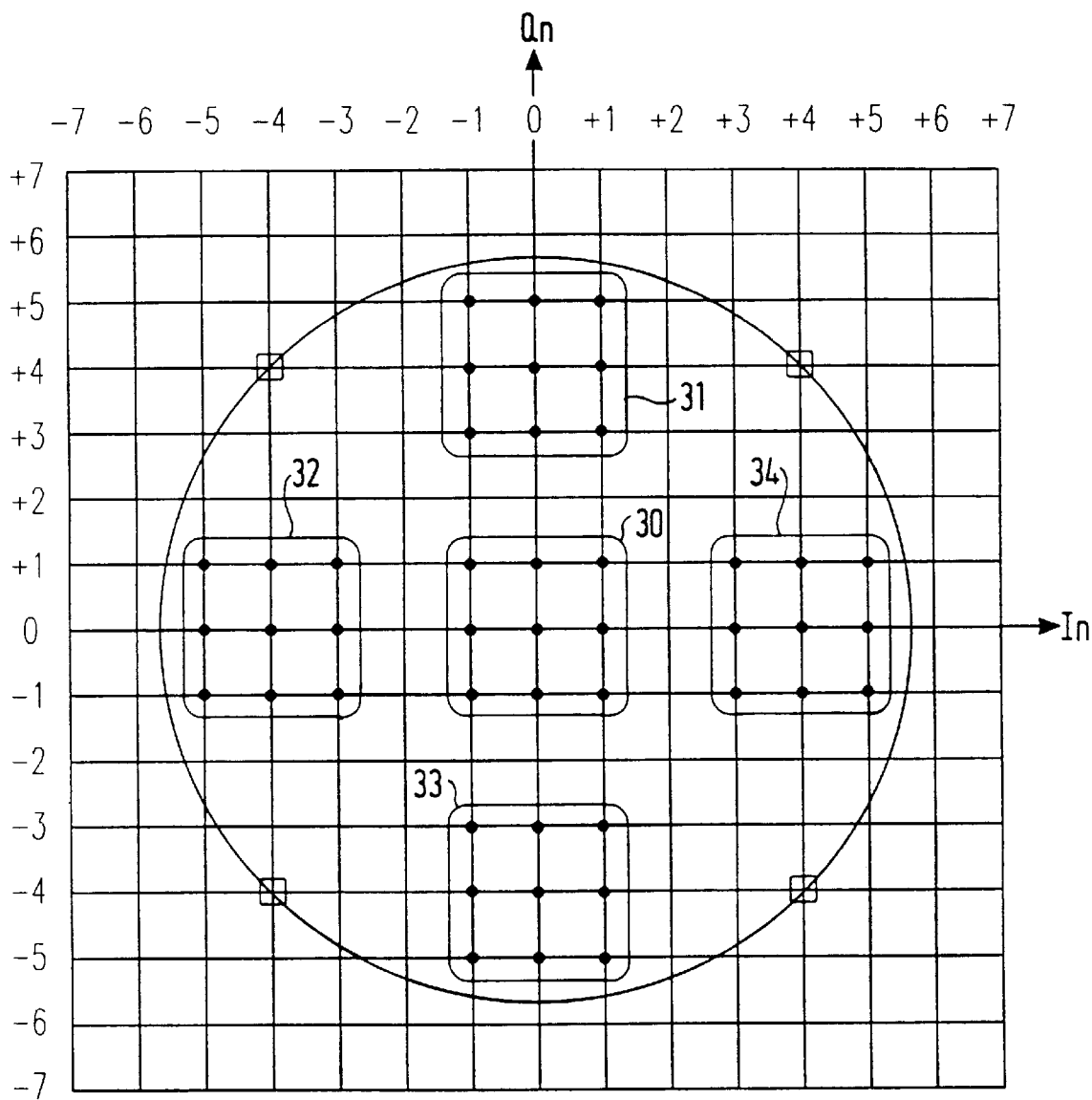
FIG. 3 shows a constellation of a QPSK modulated signal in which the indicative samples form collection areas.

FIG. 3 shows a constellation of a QPSK modulated signal in which the indicative samples form collection areas 30 through 34. The optimal samples are the same as in FIG. 2. The number of indicative samples used represents a compromise between an acceptable estimate of the Eb/No ratio and the detection of samples characteristic of two phenomena: those indicative of near end carrier recovery and those indicative of remote end carrier recovery.

In the case of remote end carrier recovery, the samples received converge towards the center of the constellation, i.e. the samples received are in collection area 30. By counting received samples in area 30 it is therefore possible to detect remote end carrier recovery (large difference between the local oscillator frequency and the received signal carrier frequency).

On the other hand, near end carrier recovery rotates the constellation near the circle on which the optimal samples lie. By counting samples received in areas 31 through 34 it is therefore possible to detect near end carrier recovery.

These two counting operations are either independent or combined, i.e. in the latter case no distinction is drawn between the samples received in the collection area 30 and those received in the areas 31 through 34. Only one counter is then needed and the calculated Eb/No ratio crossing a predetermined threshold value generates an alarm signal indicative of carrier frequency loss. If two independent counters are provided, on the other hand, the ratio calculated for the collection area 30 crossing a predetermined threshold value generates an alarm signal indicative of remote end carrier frequency loss whereas the ratio calculated for the collection areas 31 through 34 crossing a predetermined threshold value generates an alarm signal indicative of near end carrier frequency loss.

Note that each collection area 31 through 34 lies between optimal samples and that all the indicative samples are inside the circle on which the optimal samples lie. The inventors have determined that this constitutes an optimal solution if the number of indicative samples is small and if a good estimate of the Eb/No ratio can be arrived at to detect carrier frequency loss.

Figure 4:
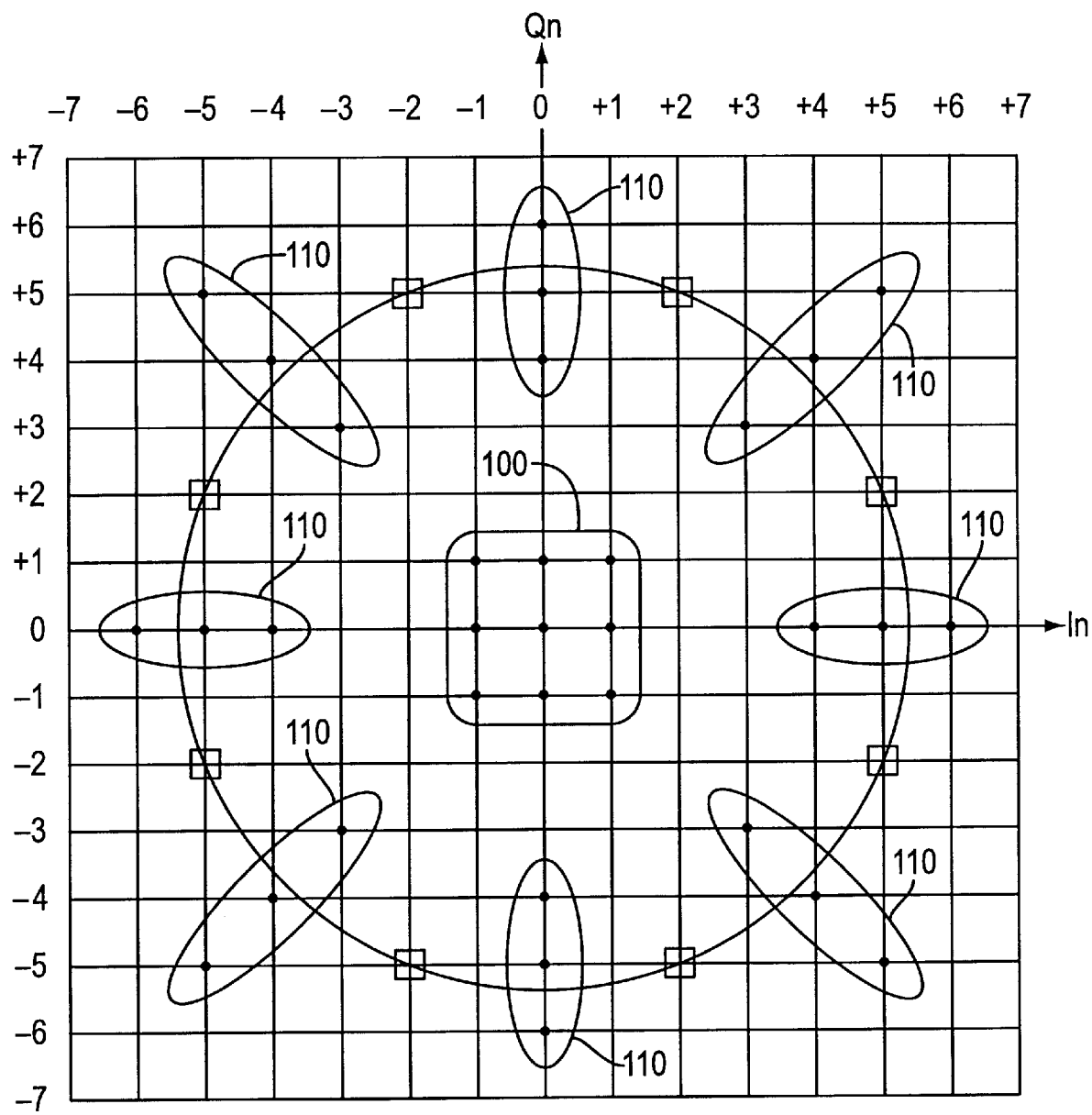
FIG. 4 shows a constellation of a PSK modulated signal with eight phase states in which each sample is coded on four bits, one of which is a sign bit.

FIG. 4 shows a constellation of a PSK modulated signal with eight phase states in which each sample is coded on four bits including a sign bit. There are eight optimal samples and the indicative samples form collection areas. There is a collection area 100 at the center of the constellation and each of the other collection areas 110 lies between two optimal samples. Area 100 of FIG. 4 is used like area 30 of FIG. 3, and areas 110 of FIG. 4 are used like areas 31 through 34 of FIG. 3.

Figure 5:
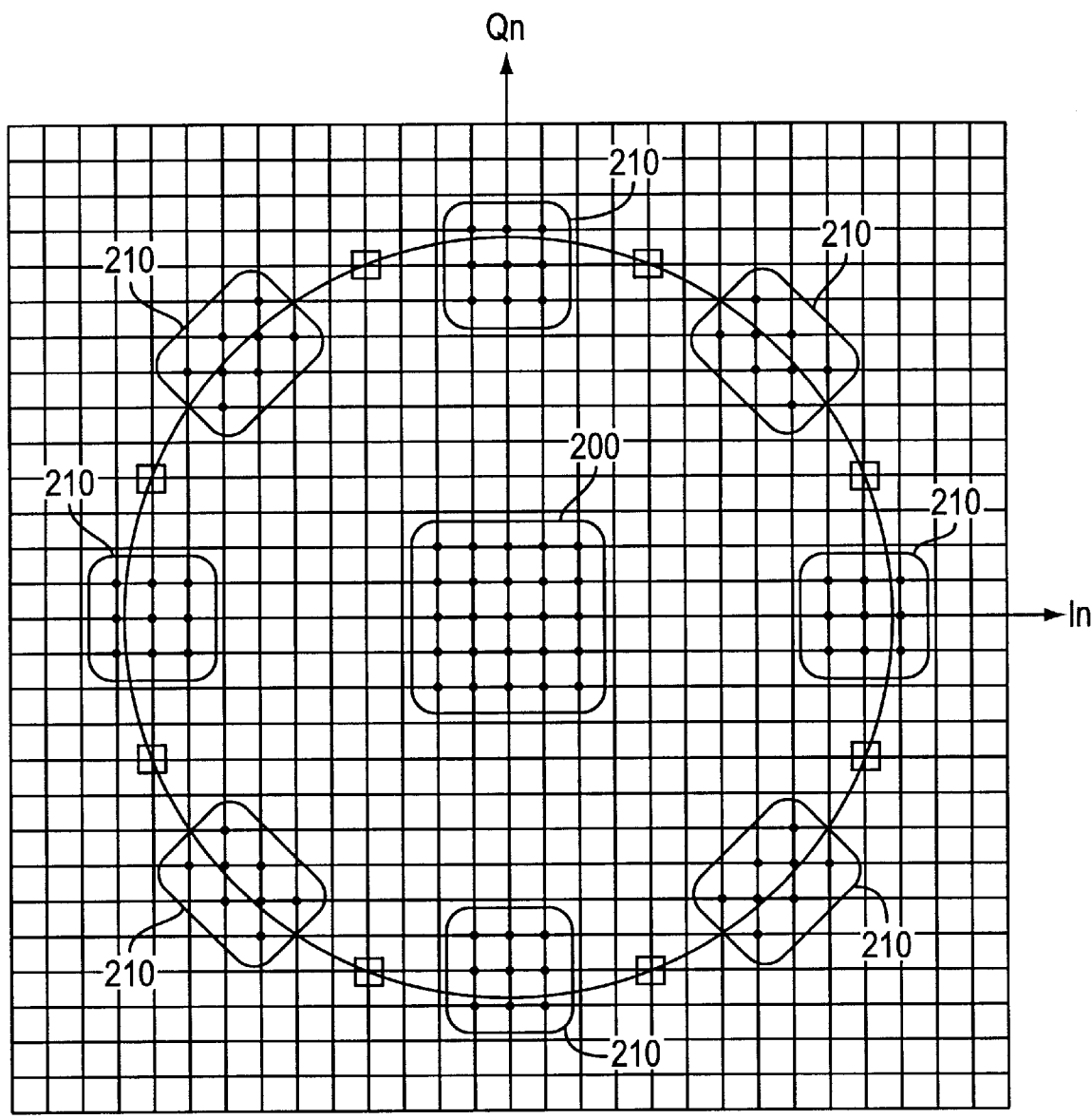
FIG. 5 shows a constellation of a PSK modulated signal with eight phase states in which each sample is coded on five bits, one of which is a sign bit.

FIG. 5 shows a constellation of a PSK modulated signal with eight phase states in which each sample is coded on five bits including a sign bit. The accuracy is increased. The indicative samples can be chosen in different ways according to what is to be measured. If the Eb/No ratio is more important, it will be beneficial to use the greatest possible number of indicative samples, as shown with reference to FIG. 1, whereas detection of (near end or remote end) reference frequency loss does not need so many indicative samples. In FIG. 5, there is a collection area 200 at the center of the constellation and each of the other collection areas 210 lies between two optimal samples. Area 200 of FIG. 5 is used like area 30 of FIG. 3, and areas 210 of FIG. 5 are used like areas 31 through 34 of FIG. 3.

The invention can be applied to all forms of modulation with constant amplitude (PSK modulation with or without offset and with M phase states where M is equal to 2, 4, 8 or more, or MSK modulation). The invention applies also, but with less benefit, to quadrative amplitude modulation with M phase states.

Figure 6:
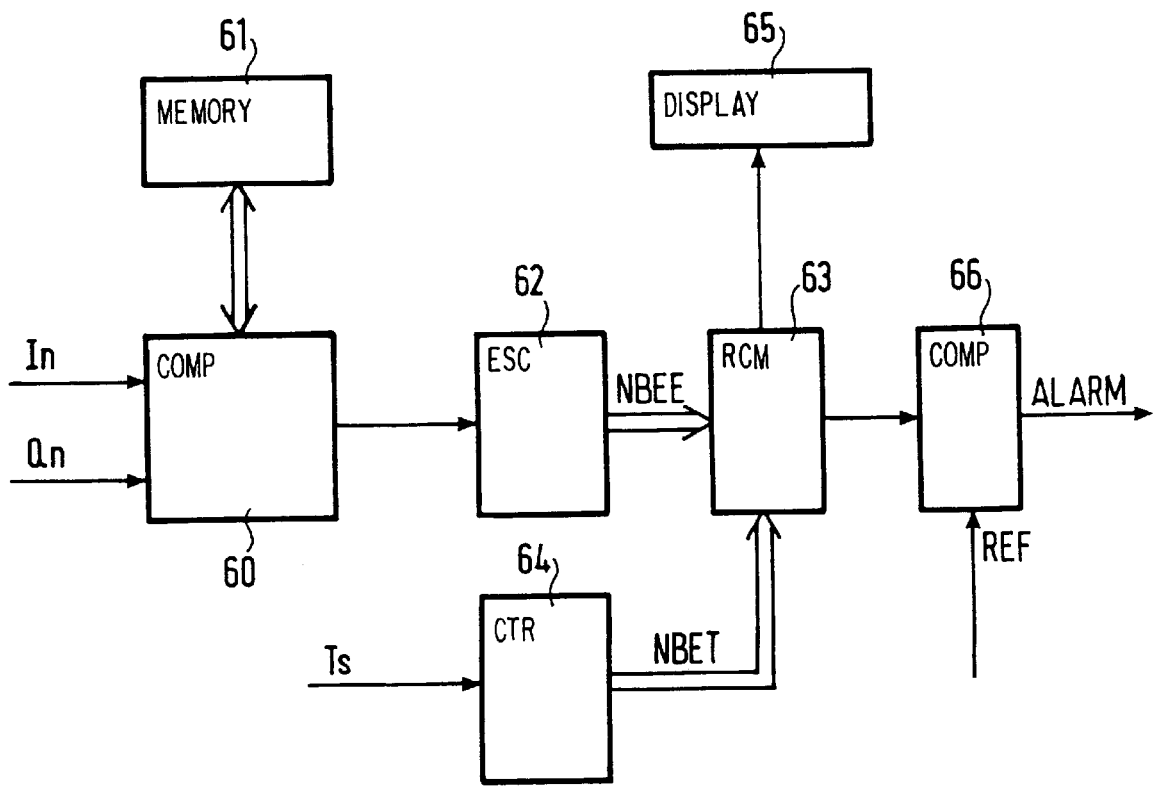
FIG. 6 is a block diagram of a preferred embodiment of the invention.

FIG. 6 is a block diagram of a preferred embodiment of the invention, and corresponds to block 23 of FIG. 1. The device essentially includes means 62 for counting the number of erroneous samples received during a given time period and means 63 for calculating the ratio between the number of erroneous samples counted and the total number of samples received during the same time period.

The phase and quadrature digital components In and Qn of each sample are sent to a digital comparator 60 connected to a memory 61 containing the coordinates of the indicative samples used. As previously mentioned, if the only function of the device of the invention is to determine the Eb/No ratio of the transmission concerned, the memory 61 contains the coordinates of all samples that can be received, except for those of the optimal samples. Each received sample In, Qn is compared to the contents of the memory 61. If the sample received is an indicative sample, the comparator 60 generates a signal which increments the erroneous sample counter 62 by 1. At the end of the measuring time the content of the counter 62 represents the number NBEE of erroneous samples counted and is passed to the ratio calculating means 63 which receive the total number NBET of samples received from a counter 64 which is incremented at the symbol timing rate Ts. The calculating means 63 calculate the ratio NBEE/NBET which is inversely proportional to Eb/No. This ratio can be fed to display means 65 and/or used to modify the parameters of the demodulator stage.

As previously mentioned, it is also possible to store in the memory 61 only the coordinates of the optimal samples in which case the calculating means 63 calculate the ratio (NBET-NBEO)/NBET. This accelerates processing and reduces the size of the memory.

To complement the Eb/No indication, the ratio calculated by the calculating means 63 can be compared by a comparator 66 to a predetermined threshold value REF representing a minimal tolerable Eb/No ratio. If this value REF is exceeded an alarm signal ALARM is generated indicating that the carrier frequency has been lost (at the near end if the indicative samples at the periphery of the constellation circle are taken into account or at the remote end if the indicative samples at the center of the constellation are counted).

It goes without saying that other embodiments of the invention are feasible and that the received samples can also be processed using a PROM (Programmable Read Only Memory).

The processing of the received samples can be simplified by processing only some of them, for example. For instance, if each sample is coded on 7×7 bits, one of which is a sign bit, it is possible to eliminate the two least significant bits (rounding off) and then to "fold" the constellation by abandoning for each component the most significant bit (sign bit). This reduces the number of bits on which each sample is coded to 4×4, the samples being then processed in only one quarter of the constellation (the quadrant in which all coordinates are positive). This effective processing area is the area 26 shown in FIG. 2.

Of course, this description has been given by way of illustrative example only and other embodiments and applications of the process and device described which do not depart from the scope of the present invention will suggest themselves to the person skilled in the art.

There is claimed:

1. A process for indirectly determining the Eb/No ratio of a digital transmission, said process being applied to a signal having a plurality of phases made up of two data streams in phase quadrature providing in each symbol time a received sample whose position in the constellation is defined by its coordinates obtained by quantizing said data streams, which process includes the steps of:

determining the number of erroneous samples received during a given time period whose coordinates correspond to those of indicative samples, the coordinates of said indicative samples being different from those of optimal samples received under optimal transmission conditions; and calculating the ratio between said number of erroneous samples and the total number of samples received in said time period, the calculated ratio being inversely proportional to said Eb/No ratio.

2. The process according to claim 1, further comprising the step of forming said indicative samples in collection areas, wherein one of said collection areas is situated at the center of said constellation, the other collection areas are each between two of said optimal samples, and said calculated ratio crossing a predetermined threshold value generates an alarm signal indicative of carrier frequency loss.

3. Process according to claim 1 wherein said indicative samples form a single collection area at the center of said constellation and said calculated ratio crossing a predetermined threshold value generates an alarm signal indicative of remote carrier frequency loss.

4. Process according to claim 1 wherein said indicative samples are all the samples of said constellation with the exception of said optimal samples.

5. Process according to claim 1 applied to a PSK modulated signal with 2, 4, 8 or more phase states.

6. A device for indirectly determining the Eb/No ratio of a digital transmission receiving a signal with a plurality of phases comprising two data streams in phase quadrature constituting in each symbol time a received sample whose position in the constellation is defined by its coordinates obtained by quantizing said data streams, said device including:

means for counting the number of erroneous samples received in a given time period whose coordinates correspond to those of indicative samples, the coordinates of said indicative samples being different from the coordinates of optimal samples received under optimal transmission conditions; and means for calculating the ratio between said number of erroneous samples and the total number of samples received during said time period, the calculated ratio being inversely proportional to said Eb/No ratio.

7. The device according to claim 6 wherein said indicative samples are in collection areas, one of said collection areas is at the center of said constellation, the other collection areas are each between two optimal samples, and further including means for comparing said calculated ratio with a predetermined threshold value to generate an alarm signal indicating that the carrier frequency has been lost if said calculated ratio exceeds said predetermined threshold value.

8. Device according to claim 6 wherein said indicative samples form a single collection area at the center of said constellation and further including means for comparing said calculated ratio with a predetermined threshold value to generate an alarm signal indicating that the carrier frequency has been lost at the remote end if said calculated ratio exceeds said predetermined threshold value.

9. Device according to claim 6 wherein said indicative samples are all the samples of said constellation with the exception of said optimal samples.

10. Device according to claim 6 wherein said signal with a plurality of phase states is a PSK modulated signal with 2, 4, 8 or more phase states.

11. A method of evaluating the quality of a multiple phase digital transmission signal, said method comprising the steps of:

obtaining from said signal two data streams in phase quadrature;

quantizing said two data streams to define constellation positions of received samples, each of said received samples having a respective constellation position and corresponding to a respective symbol time, wherein said constellation positions are each identified by coordinates, a set of all possible constellation positions defining a constellation;

defining, for said constellation, positions for optimal samples and positions for indicative samples, each of which have different respective coordinates, said positions for optimal samples corresponding to samples received under optimal transmission conditions;

determining, for a given time period, a number of erroneous samples of said received samples, wherein each of said erroneous samples has said respective constellation position corresponding to one of said positions for indicative samples; and evaluating the quality of said signal based on a ratio of said number of erroneous samples to a total number of said received samples for said given time period.

12. The method as set forth in claim 11, further comprising the steps of:

defining collection areas from said positions for indicative samples, a first one of said collection areas being situated at the center of said constellation, each of a plurality of second ones of said collection areas being situated between two of said positions for optimal samples;

generating a remote end carrier recovery signal when a number of said erroneous samples corresponding to said positions for indicative samples of said first one of said collection areas surpasses a first predetermined threshold value; and generating a near end carrier recovery signal when a number of said erroneous samples corresponding to said positions for indicative samples of said plurality of second ones of said collection areas surpasses a second predetermined threshold value.

* * * * *